(12) United States Patent
Ho

(10) Patent No.: US 9,721,246 B2
(45) Date of Patent: Aug. 1, 2017

(54) SYNCHRONIZATION PATTERNS FOR MOBILE APPLICATIONS

(75) Inventor: Michael Man Kin Ho, Danville, CA (US)

(73) Assignee: SYBASE, INC., Dublin, CA (US)

( * ) Notice: Subject to any disclaimer, the term of this patent is extended or adjusted under 35 U.S.C. 154(b) by 2190 days.

(21) Appl. No.: 11/642,886

(22) Filed: Dec. 21, 2006

(65) Prior Publication Data

US 2008/0155525 A1   Jun. 26, 2008

(51) Int. Cl.
G06F 21/00   (2013.01)
G06Q 20/36   (2012.01)
G06F 17/30   (2006.01)

(52) U.S. Cl.
CPC ... *G06Q 20/3676* (2013.01); *G06F 17/30578* (2013.01)

(58) Field of Classification Search
USPC .......................................................... 705/50
See application file for complete search history.

(56) References Cited

U.S. PATENT DOCUMENTS

| | | | |
|---|---|---|---|
| 7,200,620 B2 * | 4/2007 | Gupta | |
| 7,552,206 B2 * | 6/2009 | Nikolayev et al. | 709/223 |
| 7,730,028 B2 * | 6/2010 | Tysowski et al. | 707/610 |
| 2002/0129129 A1 * | 9/2002 | Bloch et al. | 709/220 |
| 2003/0041125 A1 * | 2/2003 | Salomon | 709/220 |
| 2003/0115378 A1 * | 6/2003 | Zondervan et al. | 709/328 |
| 2004/0117804 A1 * | 6/2004 | Scahill et al. | 719/320 |
| 2005/0028165 A1 * | 2/2005 | McGowan et al. | 719/310 |
| 2005/0055698 A1 | 3/2005 | Sasaki et al. | |
| 2006/0112398 A1 | 5/2006 | Mukkamala et al. | |
| 2006/0168259 A1 | 7/2006 | Spilotro et al. | |

OTHER PUBLICATIONS

International Search Report for PCT/US2007/025829, dated May 29, 2008, 10 pp.
International Preliminary Report on Patentability for PCT application No. PCT/US2007/025829, issued Jun. 24, 2009, mailed Jul. 2, 2009, 7 pgs.

* cited by examiner

*Primary Examiner* — Zeshan Qayyum
(74) *Attorney, Agent, or Firm* — Sterne, Kessler, Goldstein & Fox P.L.L.C.

(57) ABSTRACT

An object-oriented synchronization pattern for synchronizing a mobile application and a corresponding enterprise application is provided herein. The synchronization pattern uses service invocations to convey application state differential from the mobile device to the enterprise server and object-based database synchronization for conveying application state differential from the enterprise to the mobile device. Service invocations may be conveyed in batch or individually separately and using a variety of service types.

30 Claims, 8 Drawing Sheets

SYNCHRONIZATION PATTERNS FOR MOBILE APPLICATIONS

FIELD OF THE INVENTION

The present invention relates generally to synchronization patterns for mobile applications. In particular, the present invention relates to an object-oriented synchronization pattern with an enhanced application development environment.

BACKGROUND OF THE INVENTION

Application patterns are frequently used to help ease the design of enterprise applications.

In mobile applications, due to the potential of disconnectivity, synchronization of the application state between the mobile device and the enterprise is the one of the most important design considerations. Synchronization patterns determine the strategy that governs synchronization between the mobile device and the enterprise.

Conventional synchronization patterns rely on the conveying of the "final state" of the application from the mobile device to the enterprise. The final state is defined in terms of data and/or objects as they exist at the mobile device, without regard to the operations that led to the final state at the mobile device. As such, the conveyed state does not contain sufficient contextual information about changes at the mobile device to provide the enterprise the ability to resolve state conflicts when they occur. Conflict resolution at the enterprise, as such, is difficult to deal with and often requires extensive coding and even human intervention.

What is needed therefore is an enhanced synchronization pattern for mobile applications that does not suffer from the limitations of conventional patterns.

BRIEF SUMMARY OF THE INVENTION

The invention is directed to systems, methods and computer program products for synchronizing a mobile application and a corresponding enterprise application using an object-oriented synchronization pattern, wherein the enterprise application is a proxy of the mobile application. The synchronization pattern uses service invocations to convey application state differential from the mobile device to the enterprise server and object-based database synchronization to convey application state differential from the enterprise to the mobile device. Service invocations may be conveyed in batch or individually separately and using a variety of service types.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
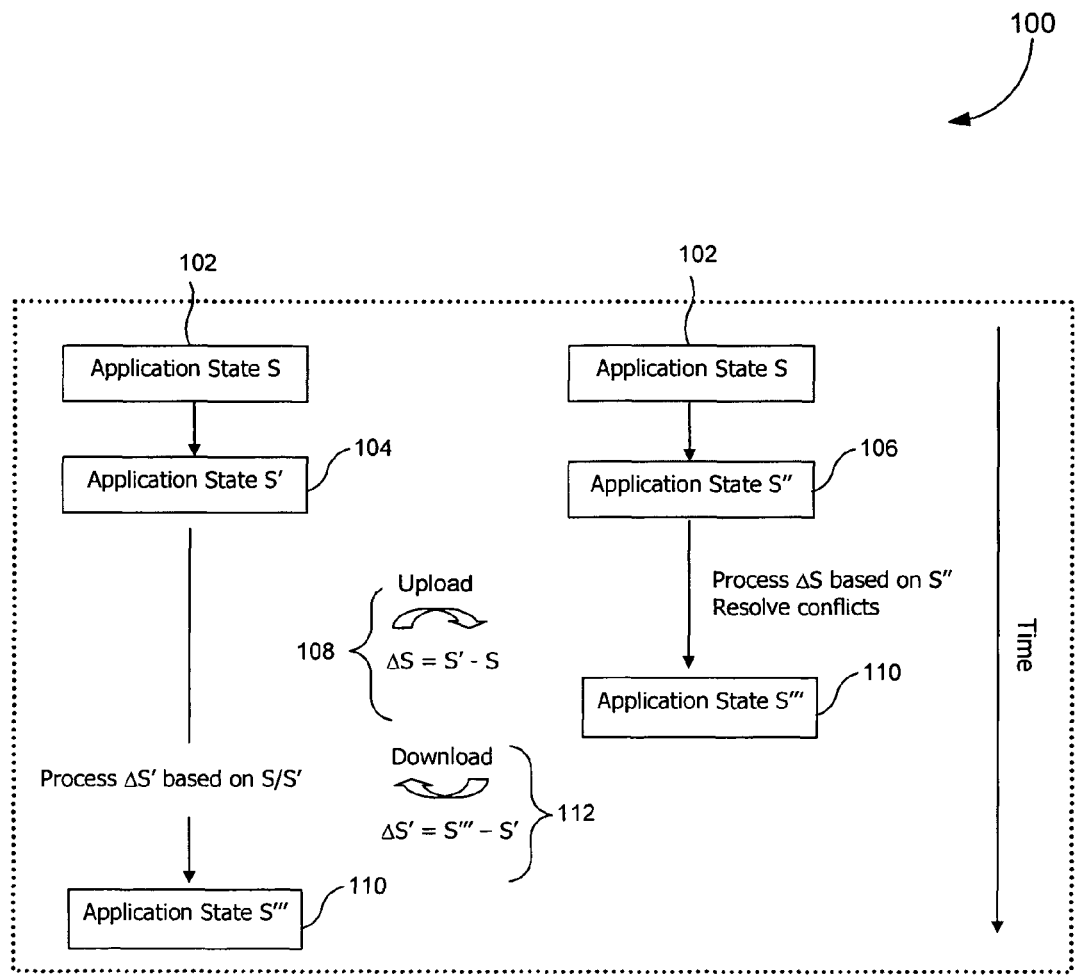
FIG. 1 illustrates an exemplary synchronization process according to the database synchronization pattern (DSP).

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

| Table of Contents | |
|---|---|
| Table of Contents | 4 |
| 1 Introduction | 4 |
|   1.1 Basic Concepts | 5 |
|     1.1.1 Mobile Application State | 5 |
|     1.1.2 Mobile Application State as a State Machine | 5 |
|     1.1.3 Application State Synchronization | 6 |
|   1.2 Database Synchronization Pattern (DSP) | 7 |
|     1.2.1 Application State | 7 |
|     1.2.2 Synchronization | 7 |
|   1.3 Business Object Pattern (BOP) | 9 |
|     1.3.1 Business Objects | 9 |
|     1.3.2 Application State | 10 |
|     1.3.3 Synchronization | 10 |
| 2 Business Service Object Pattern (BSOP) | 11 |
|   2.1 Business Service Object | 11 |
|   2.2 State Synchronization | 13 |
|   2.3 Service Invocation | 14 |
|   2.4 Service Types | 15 |
|     2.4.1 One-Way Synchronous Service | 16 |
|     2.4.2 Coarse Grained One-Way Asynchronous Service | 16 |
|     2.4.3 Coarse Grained Asynchronous Service | 17 |
|     2.4.4 Fine Grained Synchronous Service | 18 |
|     2.4.5 Online Synchronous Service | 18 |
|   2.5 Exemplary Illustration | 19 |
| 3 Implementation Embodiments | 20 |
| 4 Run Time Architecture | 21 |
| 5 Tooling | 22 |
|   5.1 Mobile Development Tooling and Architecture | 22 |
|   5.2 Design Flow | 23 |
| 6 Example Computer Implementation | 24 |
| 7 Conclusion | 26 |

1 Introduction

As used herein, mobile application patterns refer to high-level models that define, among other things, methods of state synchronization between a mobile application and a corresponding enterprise application. These patterns are of great use for mobile application developers as they hide the low-level details of mobile application development, significantly simplifying the task for developers. In the following, some basic concepts of application state synchronization will be introduced followed by a description of two mobile application patterns, namely the Database Synchronization Pattern (DSP) and the Business Object Pattern (BOP) will be described.

1.1 Basic Concepts 1.1.1 Mobile Application State

Typically, a mobile application state can be defined in terms of three types of data that are managed by the application: temporary data, reference data, and exported data. Temporary data are only available at the mobile application, i.e., they have no counterpart at the enterprise and are typically used to support the normal operation of the mobile application. Reference data are read-only data that are typically retrieved from the enterprise. Reference data may sometimes have a define lifetime, which determines their validity. If a set of reference data is cached beyond its lifetime, the mobile application may need to retrieve a later valid version from the enterprise. Exported data are similar to reference data except that they are modifiable by the mobile application. Exported data may be modified by user actions in the course of an interactive user application.

Accordingly, knowing the states of the above described data types at the mobile application allows one to duplicate the mobile application state at a different location—for example, at the enterprise or at another mobile device.

1.1.2 Mobile Application State as a State Machine

Being a function of data, an application state, whether at the mobile device or at the enterprise, will change with changes in data. As such, it is convenient to describe an application state using a state machine where changes in data cause transitions between the different states of the machine. Particularly, a Mealy state machine, which is a finite state machine having an output that is a function of current state and input, is convenient for this purpose.

In the case of a mobile application, the outputs of the application are the operations that are invoked by inputs into the application. As such, given that an initial state of the mobile application is known, knowledge of the operations that have been invoked at the mobile application is sufficient to determine the final state of the application that results from the execution of these operations. Further, the final state of the mobile application may be determined at any location (at the enterprise or other mobile device, for example) given that enough information is captured of the operations executed at the mobile to enable a "playback" of these operations starting from the initial state of the application.

1.1.3 Application State Synchronization

As noted above, an important aspect of mobile application patterns relates to the synchronization between a mobile application and a corresponding application at the enterprise. As such, based on the above, synchronization between the mobile and the enterprise to convey the current state of the mobile application can be performed either by 1) conveying the data sets (reference data, exported data) that define the application final state; or 2) conveying the set of operations executed at the mobile starting from an initial state that is assumed to be known at the enterprise.

Both approaches result in the same state at the enterprise; however, they are functionally different. In the first approach, the final state is known in terms of the sets of data that define it, but the operations from the initial state that lead to the final state are unknown. Typically, the relationship between operations and a final state is a many-to-one correspondence, which entails that any final state can be reached from an initial state using a plurality of different sets of operations. As such, knowing the final state does not necessarily imply knowing the operations used to reach that final state. On the other hand, the second approach conveys the exact operations that lead to the final state starting from the initial state, which when executed result in the same sets of data that define the final state in the first approach.

In certain cases, either approach can be used with similar synchronization performance. In other cases, however, the first approach may not contain enough contextual information for successful synchronization. This is the case, for example, when the enterprise application communicates with a plurality of mobile applications and synchronization conflicts arise with one or more mobile applications being simultaneously synchronized.

As would be apparent to a person skilled in the art based on the teachings provided herein, synchronization from the enterprise to the mobile (i.e., conveying changes of the enterprise application to the mobile device) may also be performed using the two approaches described above, though it is less typical to use the second approach.

1.2 Database Synchronization Pattern (DSP)

Database Synchronization Pattern (DSP) refers to use of database synchronization to synchronize entities based on relational schema. DSP is a very practical and powerful pattern commonly in use by mobile applications. It is important to note here that DSP is different from the database synchronization technology, which is a means for synchronizing relational data between two entities using relational database technology.

1.2.1 Application State

In DSP, the state of the mobile application is defined in terms of the set of database tables on the mobile device. As noted above, these can be reference, temporary, or exported entities. Typically in DSP, only exported entities or data are synchronized between the mobile device and the enterprise. In general, the set of tables constituting exported entities are derived from another set of tables within a consolidated database on the enterprise. These two sets of tables do not have to be identical, and a mobile synchronization middleware may be used to define and maintain the relationship between the two (using publications) or to issue subscriptions to refer them to a particular user.

1.2.2 Synchronization

FIG. 1 is a diagram that illustrates an exemplary synchronization process 100 according to DSP. Initially, the mobile device and the enterprise share a common initial application state S 102, i.e., reference and exported entities (data) are the same on both ends. Note that having the same application state does not necessarily imply a one-to-one mapping of database tables between the device and the enterprise.

As time progresses, the application states of the mobile device and of the enterprise diverge from one another. The divergence may be due to changes to the sets of database tables—due to modification, insertion, or deletion of database rows—at one or both of the device and the enterprise. In exemplary process 100, the application state at the mobile changes from S 102 to S' 104, while the application state at the enterprise changes from S 102 to S" 106.

With divergence between the mobile and the enterprise application states, synchronization will be needed to bring the two application states into accord. In DSP, synchronization is based on the final state approach as described above in 1.1.3 (i.e., conveyance of the final application state as defined in terms of exported and reference entities) and includes a two-step process. In exemplary process 100, this begins in step 108, which includes uploading from the mobile to the enterprise the state differential ΔS between mobile application state S' 104 and initial application state S 102. This state differential captures all changes to the exported entities made at the mobile device and is processed at the enterprise to cause a change in the enterprise application state from S" 106 to S'" 110. Note that processing of the state differential ΔS at the enterprise typically includes conflict resolution since both the mobile device and the enterprise may (as they diverge from initial state S 102 to respective states S' 104 and S" 106) change the same database rows. Conflict resolution then involves determining the correct state of a particular set of data given that changes to that set of data have been made both at the mobile and at the enterprise. In certain cases, conflict resolution may involve complex processing that requires specific business rules and/or human intervention.

The two-step synchronization process then continues in step 112, which includes downloading from the enterprise to the mobile device the state differential ΔS' between enterprise application state S'" 110 and current mobile application state S' 104. State differential ΔS' is processed at the mobile device to cause a change of the mobile application state from S' 104 to S'" 110. Note that in one approach, only state S'" 110 is conveyed to the mobile application and is used in its entirety to replace mobile application state S' 104, thereby bringing the mobile and the enterprise in synchronism. This approach, however, may result in poor synchronization performance in case of limited bandwidth and high latency of the link between the mobile device and the enterprise. As such, conveying of only the state differential as illustrated in exemplary process 100 may be a more efficient approach.

As noted above, DSP is a highly versatile synchronization pattern and is widely used today in mobile application development, especially with it being a very efficient pattern for data collection applications. Data collection applications are applications that use mobile devices to collect and upload information to the enterprise for processing. For conflict resolution, DSP depends on techniques to avoid conflicts such as partitioning, for example. However, limitations of DSP begin to appear when conflicts become unavoidable. Further, coding of conflict resolution rules can be complicated particularly that application state conveyance in DSP is done using the final state approach and contains no contextual information for rules to operate on.

1.3 Business Object Pattern (BOP)

In this section, an object based synchronization pattern is presented. In certain cases, object based synchronization patterns may be preferred to database synchronization pattern as they may simplify application development, reuse, and maintainability.

1.3.1 Business Objects

Business objects represent tangible entities within an application that users create, access, and manipulate while using the application. Business objects are typically stateful, persistent, and long-lived and contain business data, which models the business behavior being simulated by the application. As such, a business object is different from a pure data object as it encapsulates both business data and business behavior.

The business behavior of a business object is exposed via an interface, which consists of methods. External actors (e.g., mobile users using the application user interface) invoke these methods to perform certain functions they provide. During execution of methods, the internal state of a business object may change and the business object may collaborate with other business objects to enable the business process.

Business objects used by mobile applications are termed mobile business objects. They are similar to generic business objects but usually implement limited local business logic. This local business logic performs validation and executes business rules that do not depend on resources at the enterprise. Thus, execution of the business logic will only result in changes locally and therefore supports disconnected usage.

1.3.2 Application State

In a Business Object Pattern (BOP), the application state of a mobile application includes a set of objects used by the application on the mobile device. In implementation, this set of objects can be persisted on the device in different ways, including using a relational database via object/relational mapping (O/R) or through XML files for smaller data sets. The set of objects may include temporary, reference, and exported objects. Exported objects as described above are of most importance in the synchronization process.

1.3.3 Synchronization

Synchronization in a BOP is based on a final state approach as described above with the final state defined in terms of the set of objects (exported, reference) used by the application.

Assuming that both the mobile device and the enterprise share a common application state S at an initial time, the application states at the mobile and the enterprise may diverge from each other as time progresses due to objects being modified, created, or deleted at one or both of the mobile device and the enterprise.

Synchronization of the mobile and the enterprise application states in BOP, similar to synchronization in DSP, includes an upload and a download process. In the upload, new, modified, or deleted objects at the mobile device are uploaded to the enterprise. The enterprise processes the objects, resolves any conflicts, and initiates a download to the mobile of current objects at the enterprise. Synchronization therefore is performed solely using objects.

From a developer's point of view, entities exchanged between the mobile device and the enterprise are sets of objects to be added, modified, or deleted. Thus, when a conflict occurs, the developer is given the ability to resolve it using as context three instances of the same object: remote original instance at the device, remote updated instance at the device, and current instance from the enterprise.

As would be apparent to a person skilled in the art based on the teachings provided herein, BOP is similar to DSP in that both synchronization patterns employ final state synchronization. One advantage to BOP over DSP, however, relates to the object abstraction provided by using objects in BOP. For example, rather than working with application programming interfaces (APIs) specific to the persistence layer (e.g., SQL), developers only need to work with objects, with a mapping layer supporting the abstraction between these objects and the persistence layer.

2 Business Service Object Pattern (BSOP)

Business Service Object Pattern (BSOP) is a novel approach for application state synchronization between a mobile device and an enterprise. BSOP employs service invocations to propagate changes from the mobile device to the enterprise, which explains the naming of this approach. Embodiments of BSOP according to the present invention are described below.

2.1 Business Service Object

A business service object is a business object with the addition of business service methods or enterprise business methods. Business service methods are proxy methods to enterprise business methods. In other words, business service methods can be called at the mobile device to invoke the enterprise business methods at the enterprise. In addition, business service methods invoke local methods at the mobile device to cause business services/operations at the mobile. Similarly, the enterprise business methods invoke local methods at the enterprise to cause the same business services/operations at the enterprise. In one embodiment, mobile agents are employed to cause the service invocations at the enterprise.

In BSOP, changes made to business objects at the mobile device are not propagated to the enterprise. Instead, "equivalent" changes are caused at the enterprise through service invocations. In an embodiment, service invocations are dispatched to the enterprise immediately as they occur at the mobile device or in batches. In some cases, service invocations are conveyed to the enterprise during the upload phase of a synchronization session.

Accordingly, in BSOP, the mobile application state is conveyed to the enterprise not by conveying the mobile application's local state consisting of objects but by conveying the series of business operations invoked by business service methods at the mobile. As a result, since the local state is not propagated to the enterprise, two approaches may be used to maintain the local state at the mobile.

In one approach, the local state is not updated when business operations are executed but only when business objects that would have been modified by the business operations need to be updated again. In other words, when a business service method at the mobile would have modified a business object, no actual modification is performed on the object until this object needs to be accessed again. The logic behind this approach is that when a series of operations can be exclusively sufficient to update the application state at the enterprise, this same series of operations can be sufficient to bring the application state at the mobile to what would be the "current" view of the application state. Naturally, this approach may reduce the time average of processing usage at the mobile device but at the same time would result in high processing periods when the series of (unexecuted) operations is allowed to grow.

Another approach works by immediately modifying business objects as business service operations are invoked at the mobile device. A drawback of this approach, however, appears when invoked service operations at the enterprise fail to execute. For the purpose of illustration, consider a scenario in which the existing view V of a mobile business service object is modified to V' when one of its associated business service methods is executed at the mobile. However, when the service invocation is conveyed to the enterprise, it fails to execute and the business service object at the enterprise thus remains unchanged with a view V. Subsequently, when synchronization between the mobile and the enterprise takes place, the mobile is not aware of the inconsistency between the mobile view V' and the enterprise view V and does not propagate this difference as part of the state differential. This problem can be fixed by either 1) routing a failure notification to the mobile when the service invocation fails at the enterprise and undoing the business service object change at the mobile; 2) detecting the execution failure at the enterprise and marking the business object(s) associated with the service invocation as modified in order to have them reinstated to their original states at the mobile; or 3) using a total replacement synchronization instead of differential synchronization, which naturally results in potentially large synchronization duration.

2.2 State Synchronization

Figure 2:
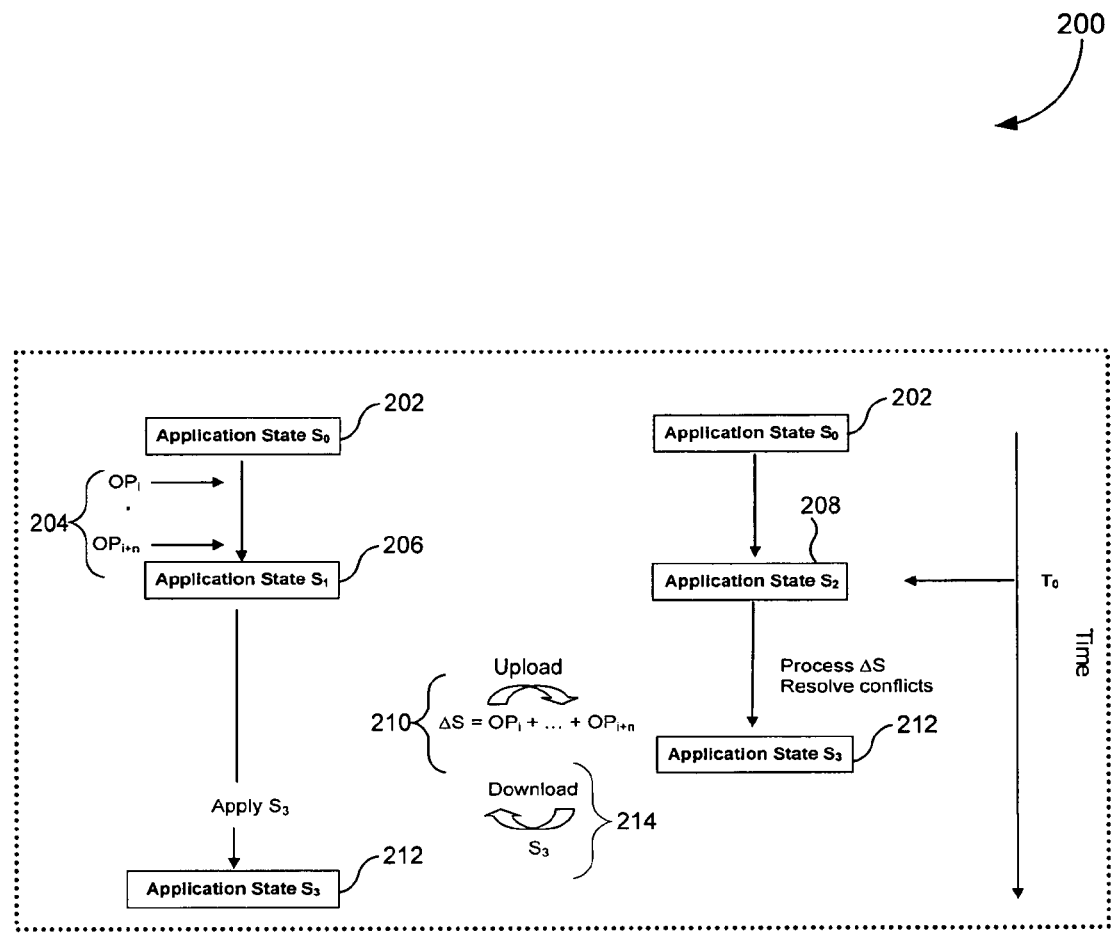
FIG. 2 illustrates an exemplary session-based synchronization process according to the business service object pattern (BSOP).

FIG. 2 is a diagram that illustrates an exemplary synchronization process 200 according to BSOP. Initially, both the mobile device and the enterprise share a common application state $S_0$ 202. As described above, the application state consists of business objects at the mobile device and of corresponding business objects at the enterprise. The application state is derived from data and/or properties associated with these business objects.

As time progresses, application states at the mobile and the enterprise diverge from each other. In the example of FIG. 2, a series of business service methods $\{OP_i, \ldots, OP_{i+n}\}$ 204 are invoked at the mobile device that result in local changes to business objects at the mobile, thereby causing the mobile application state to change from $S_0$ 202 to $S_1$ 206. Simultaneously, business operations change the enterprise application state from $S_0$ 202 to $S_2$ 208.

Subsequently, synchronization between the mobile and the enterprise takes place, which includes an upload phase 212 and a download phase 214. In upload phase 212, service invocations corresponding to business service methods $\{OP_i, \ldots, OP_{i+n}\}$ 204 are conveyed from the mobile device to the enterprise. In the example of FIG. 2, this conveyance is performance in batch mode, whereby all service invocations are delivered together. In other embodiments, service invocations may be individually dispatched separately.

The service invocations invoke corresponding enterprise business methods at the enterprise, which in turn cause business operations at the enterprise that are equivalent to those executed at the mobile device. As such, the service invocations are processed at the enterprise. This processing, however, is not limited to the execution of the corresponding enterprise business methods but typically involve resolving conflicts as described above.

When the enterprise business methods are successfully invoked and executed at the enterprise, the enterprise application state is modified from $S_2$ 208 to $S_3$ 212. Subsequently, the download phase 214 of the synchronization process takes place, which includes conveying the current enterprise application state $S_3$ 212 to the mobile device. Note that this conveyance is performed by actual conveyance of business service objects to the mobile, i.e., it is a final state conveyance.

The mobile device applies $S_3$ 212 to its application state to effectively change it to $S_2$ 212, thereby bringing it in sync with the enterprise application.

2.3 Service Invocation

As note above, in BSOP, service invocations may be performed in batch or individually separately. FIG. 2, for example, depicts a session based synchronization process 200 in which service invocations are uploaded in a batch to the enterprise. It is also assumed in process 200 that all service invocations must execute completely at the enterprise before the download phase begins. Typically, this is a simple model to use by developers but which also has its limitations. For example, service invocations must execute within a reasonable amount of time to avoid unacceptably long synchronization time.

Another model allows service invocations to be dispatched immediately via reliable messaging. The execution of the service invocations is independent of the download phase of synchronization. Accordingly, changes resulting from execution of the service invocations at the enterprise are conveyed to the mobile device at a later or in an asynchronous fashion. The immediate advantage of this model is the ability to support two-way asynchronous service invocations. Further, synchronization time and synchronization failures due to intermittent connectivity can be reduced.

As such, BSOP may use either database synchronization (session based) or reliable messaging to send service invocations to the enterprise. On the other hand, database synchronization is exclusively used for sending modified, new, or deleted objects to the mobile device.

The choice between database synchronization and reliable messaging to send service invocations depends on various factors, which include, among others, the granularity of the invoked service. It is essential, for example, that the invoked service does not cause inconsistencies in the enterprise application state. For example, a service invocation cannot be dispatched individually separately when additional service invocations will be needed to bring the enterprise application into a valid state. Further, service invocations that are qualified for immediate delivery can be dispatched in the order that they are created, and a reliable messaging module can be used to guarantee that they are received in the same order at the enterprise.

2.4 Service Types

In this section, different types of service invocations will be provided. These services differ in terms of their applicability, advantages, and limitations. Typically, a service type has different characteristics that affect its applicability and usage in a mobile environment. These characteristics include:

1. Synchronicity, which determines whether a response to a service invocation, if any, is returned in the same context as the service invocation or in a different one.
2. Service time, which indicates the service execution time at the enterprise. For example, synchronous services are guaranteed low service time because it is assumed that the client will be waiting for the execution result.
3. Directionality, which indicates whether the service is unidirectional (one-way service) or bidirectional (request/response service).
4. Idempotency, which indicates whether the service may be executed repeatedly without causing problems.
5. Transactionality, which refers to the ability of the service to control transactions from invocation to execution.

Generally, developers only need to know these characteristics of the different types of services in order to correctly employ them in applications.

2.4.1 One-Way Synchronous Service

The one-way synchronous service is a unidirectional service (no response) with guaranteed low service time. This service is most suitable for business methods where the mobile application immediately expects the result of service execution (not to be confused with a response) at the enterprise after synchronization. Also, since the mobile application expects the result of execution at the end of synchronization, the upload phase must wait for the service execution. Accordingly, database synchronization, instead of reliable messaging, is used to satisfy this sequential requirement of synchronization. In addition, synchronization time is directly proportional to the cumulative service time of invoked services.

Typically, a mobile middleware ensures that the service is delivered to the enterprise exactly once regardless of connectivity. This removes the consideration for idempotency and limits non-transactional exposure.

2.4.2 Coarse Grained One-Way Asynchronous Service

The coarse grained one-way asynchronous service type is a unidirectional service with unbounded service time. This service is most suitable for the disconnected environment as there is no temporal dependency between the mobile application and the service execution.

Coarse grained one-way asynchronous services are mostly concerned with processing at rather than "reading" information from the enterprise, although they may be used for reading from the enterprise in certain usage modes. Execution of asynchronous services can result in changes to the set of mobile objects at the enterprise. However, these changes should not coincide with the state derived from a synchronization initiated by the mobile application as to not result in partially modified objects downloaded by the mobile device. For example, in the setting of a mobile sales application, a purchase order could be missing some of the order items.

Further, since the coarse grained one-way asynchronous service has no return response, external triggers are required to notify the mobile device of service completion and to pull in the updated mobile objects at the enterprise via synchronization. The mobile is usually informed via a notification pattern rather than via a response.

2.4.3 Coarse Grained Asynchronous Service

The coarse grained asynchronous service is a bidirectional service with unbounded service time. The response to a service invocation can be a status or a new set of data objects. Similar to the one-way asynchronous service, this service type is also concerned with propagating changes to the enterprise rather than accessing information from the enterprise. Also, since it is asynchronous, the response is delivered to the device in a different thread context than that of the service invocation.

Response delivery to the mobile device can be performed in different ways depending on the type of channel used for service invocation (database synchronization or reliable messaging). For database synchronization, the response will be in the form of a table/row, and application developers can set an attribute to cause a "push" of the response to the client via a server initiated push feature at the enterprise. In the case of reliable messaging, a return message will carry the response back to the mobile device.

For services that only return a status, their execution result may be reflected in the set of mobile objects downloaded to the device during subsequent synchronization. Also, to avoid having the mobile device "polling" for updates by randomly issuing synchronization requests, the developer can set an attribute to trigger synchronization during response.

2.4.4 Fine Grained Synchronous Service

The fine grained synchronous service is a bidirectional service with very low service time. This service is typically used to access information from the enterprise, but it may also be used to propagate changes to the enterprise. As such, it is mostly delivered via reliable messaging.

This service may also be used with an asynchronous interaction pattern, which avoids blocking of the user interface due to connectivity problems, i.e., the user interface will remain responsive while services are being sent and executed. A few conditions are assumed for application of this pattern: the invoked service is known a priori to have a very limited service time and the mobile application is operating with reasonable network connectivity.

2.4.5 Online Synchronous Service

The online synchronous service is a bidirectional service with limited service time. This service is mostly used to access time critical data at the enterprise but can also be leveraged to send acknowledgments for blocking changes back to the mobile device (a blocking change is one that requires an acknowledgment from the enterprise in order to occur). In that respect, online synchronous services are to be used with caution because blocking changes may cause the user interface at the mobile to become unresponsive, especially with unreliable connectivity and high latency. On the other hand, online synchronous services simplify the user interface design as the response is delivered in the same threading context as the service invocation. In one embodiment, online synchronous service invocations are delivered via an HTTP(s) connection and do not rely on mobile clients or infrastructure.

2.5 Exemplary Illustration

Figure 3:
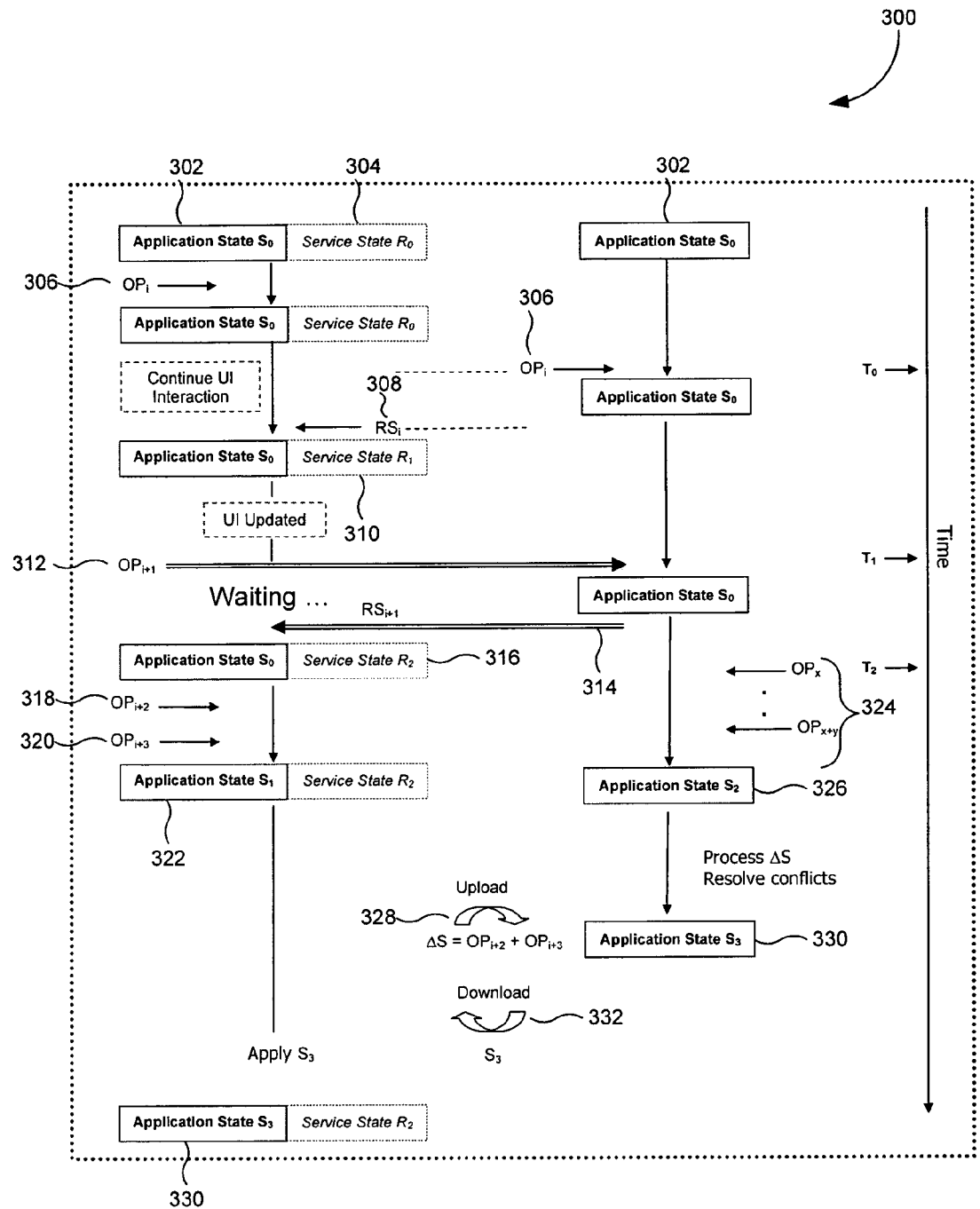
FIG. 3 illustrates an exemplary synchronization process according to BSOP.

FIG. 3 illustrates an exemplary synchronization process 300. Process 300 begins with both the mobile device and the enterprise having a common application state $S_0$ 302, which is defined by a set of mobile objects. Additionally, the mobile device maintains a service state, which consists of temporary mobile objects used to hold returned objects from service invocations at the enterprise. Initially, the service state at the mobile is $R_0$ 304.

At time $T_0$, a service invocation $OP_i$ 306 is invoked asynchronously via a reliable messaging mechanism. It is noted that the user interface continues to be responsive to the user while the service invocation is outstanding. Also, assuming that $OP_i$ 306 is only reading information from the enterprise, the application states at both the mobile device and the enterprise remain unaffected.

When a result $RS_i$ 308 to service invocation $OP_i$ 306 is returned some time later, it modifies the service state at the mobile device from $R_0$ 304 to $R_1$ 310 and triggers an update of the user interface.

At time $T_1$, a service $OP_{i+1}$ 312 is invoked by the mobile application via an online synchronous service. As such, the user interface stops to respond while it waits for an execution result $RS_{i+1}$ 314 from the enterprise. Assuming that $OP_{i+1}$ 312 is a read-only service, no changes to the application states at both ends will occur when $RS_{i+1}$ 314 is received. However, when $RS_{i+1}$ 314 is returned, it can either be used directly to update the user interface or stored in temporary mobile objects for later reference. If stored first, the service state at the mobile device will change from $R_1$ 310 to $R_2$ 316, as illustrated in FIG. 3.

At time $T_2$, the mobile application issues two service invocations, $OP_{i+2}$ 318 and $OP_{i+3}$ 320, which are synchronous and unidirectional. The execution results to service invocations $OP_{i+2}$ 318 and $OP_{i+3}$ 320 are to be delivered at the end of synchronization. The mobile application state changes from $S_0$ 302 to $S_1$ 322 when the two service invocations cause local changes to objects at the mobile device. At the same time, exemplary process 300 assumes that the application state at the enterprise changes from $S_0$ 302 to $S_2$ 326, due to other service invocations $OP_x$, ..., $OP_{x+y}$ 324 from other mobile devices.

Subsequently, service invocations $OP_{i+2}$ 318 and $OP_{i+3}$ 320 are delivered to the enterprise via database synchronization, which includes an upload phase 328 and a download phase 332. At the end of upload phase 328, the enterprise application state changes to $S_3$ 330 with the execution of services $OP_{i+2}$ 318 and $OP_{iївз}$ 320 at the enterprise. Download phase 332 follows with the conveying of the new enterprise state $S_3$ 330 to the mobile device, which is applied at the mobile to change the mobile application state from $S_1$ 322 to $S_3$ 330, thereby bringing the mobile device and the enterprise in sync.

3 Implementation Embodiments

State synchronization according to embodiments of the present invention may be implemented in various ways. In one embodiment, a top down approach that uses a canonical representation of objects as synchronized units is employed. The canonical representation is independent of the persistence strategy used for objects, and the actual persistence of objects can vary depending on resource availability at the device. Assuming that a mapping exists between the persistence implementation and the canonical representation, a mediator pattern is used to link them together. A few practical issues exist with this approach including the difficulty of finding a canonical representation that will be suitable for objects derived from different types of data (e.g., relational tables, web services, legacy data format, etc.), the conflicting requirements of efficiency in representation and transmission versus clarity and legibility, and the lack of globally accepted standards to support this approach. A potential canonical representation that could be used is the one based on the Service Data Objects specification (SDO-JSR 235) jointly developed by IBM and BEA.

Another approach employs a physical representation of objects as synchronized units. This implementation may, for example, be based on iAnywhere's relational data synchronization technology, which allows full transaction support, SQL capabilities, and efficient data access and linkage with relational model on the enterprise.

Figure 4:
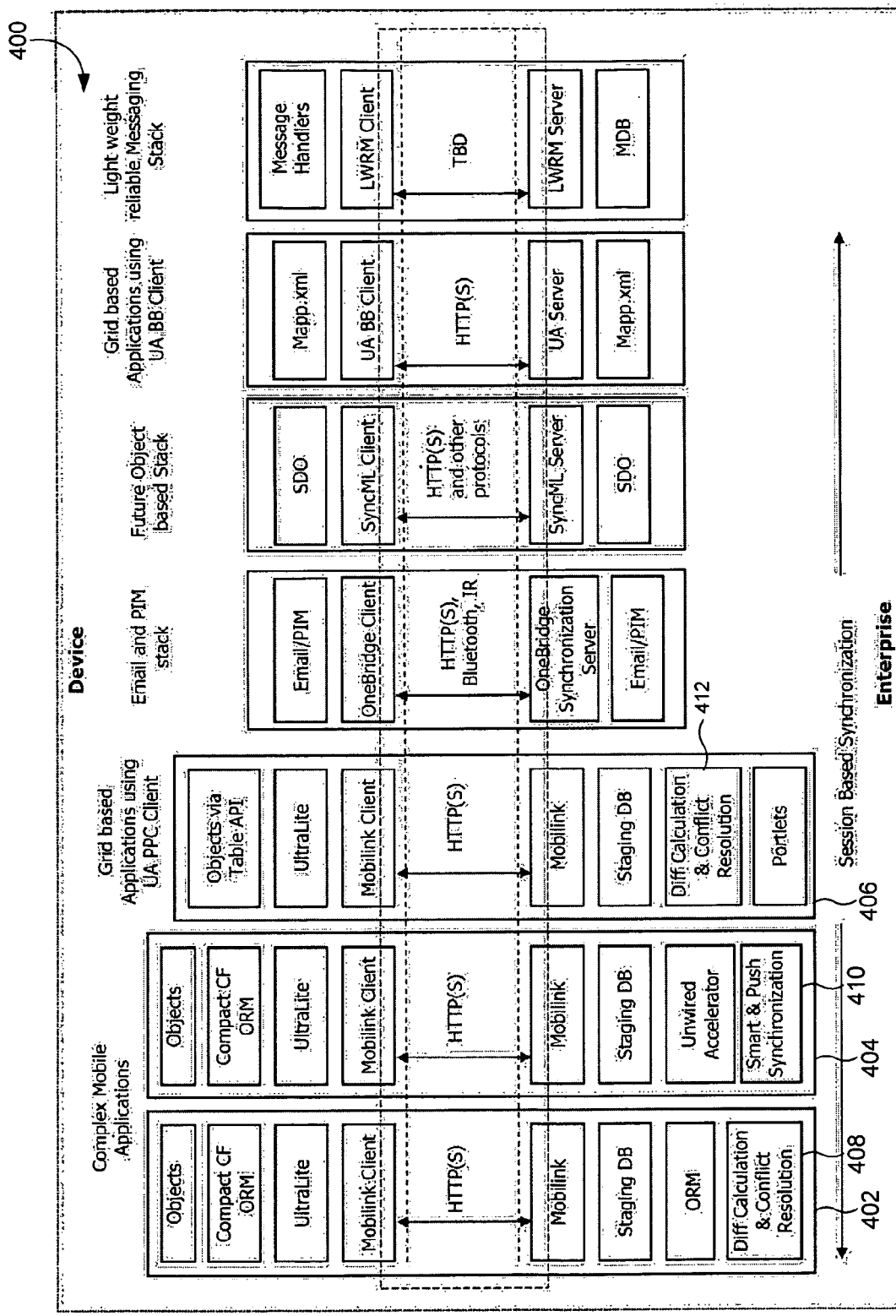
FIG. 4 illustrates exemplary synchronization stacks for enabling mobile applications.

FIG. 4 illustrates an example 400 of various synchronization stacks that can be used to support different types of mobile applications. Stacks 402, 404, and 406 implement synchronization stacks for relational data mobile applications. Note that stacks 402, 404, and 406 all employ a mobility synchronization server (for example, MOBILINK from Sybase, Inc. of Dublin, CA, although the invention is not limited to this example) to enable synchronization between the device and the enterprise. Also illustrated in stack 402 is a Differential Calculation and Conflict Resolution module 408, which is used by the enterprise to determine application state differential between the mobile and the enterprise. Stack 406 employs a similar module 412. Stack 404 employs a Smart & Push Synchronization module 410, which provides an important feature for mobile applications. As described above, push synchronization allows the enterprise to send notification to the device when execution of a particular service has been completed, thereby eliminating the need for continuous polling by the device.

4 Run Time Architecture

Figure 5:
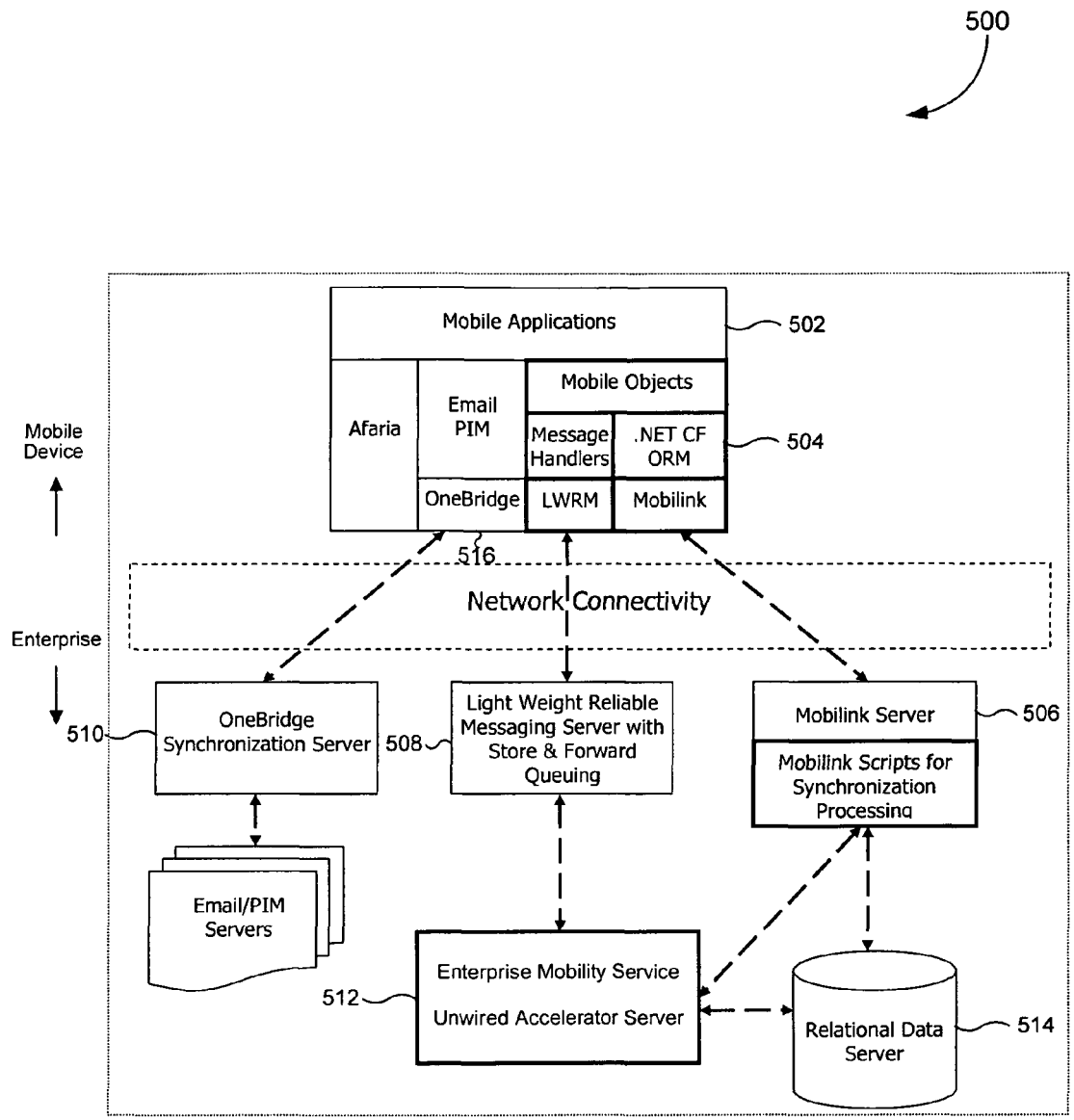
FIG. 5 illustrates an exemplary run time architecture for enabling synchronization in complex mobile applications.

FIG. 5 illustrates an exemplary run time architecture 500 for enabling synchronization in complex mobile applications. At the client side, mobile applications 502 are supported by a mobility framework 504, which includes mobile objects, message handlers, an Object Relational Mapping (ORM) module, a mobility synchronization client server, and a reliable messaging server. Mobility framework 504 is capable of supporting BSOP. Corresponding modules at the enterprise include a mobility synchronization host server 506 having mobility scripts for synchronization processing, a reliable messaging server 508 with store and forward queuing, and an UNWIRED ACCELERATOR server 512. UNWIRED ACCELERATOR 512 is responsible for executing invoked services at the enterprise by accessing a relational data server 514. Synchronization for email/PIM services is also enabled in architecture 500 via email synchronization servers 510 and 516 at the enterprise and the mobile device, respectively.

Figure 6:
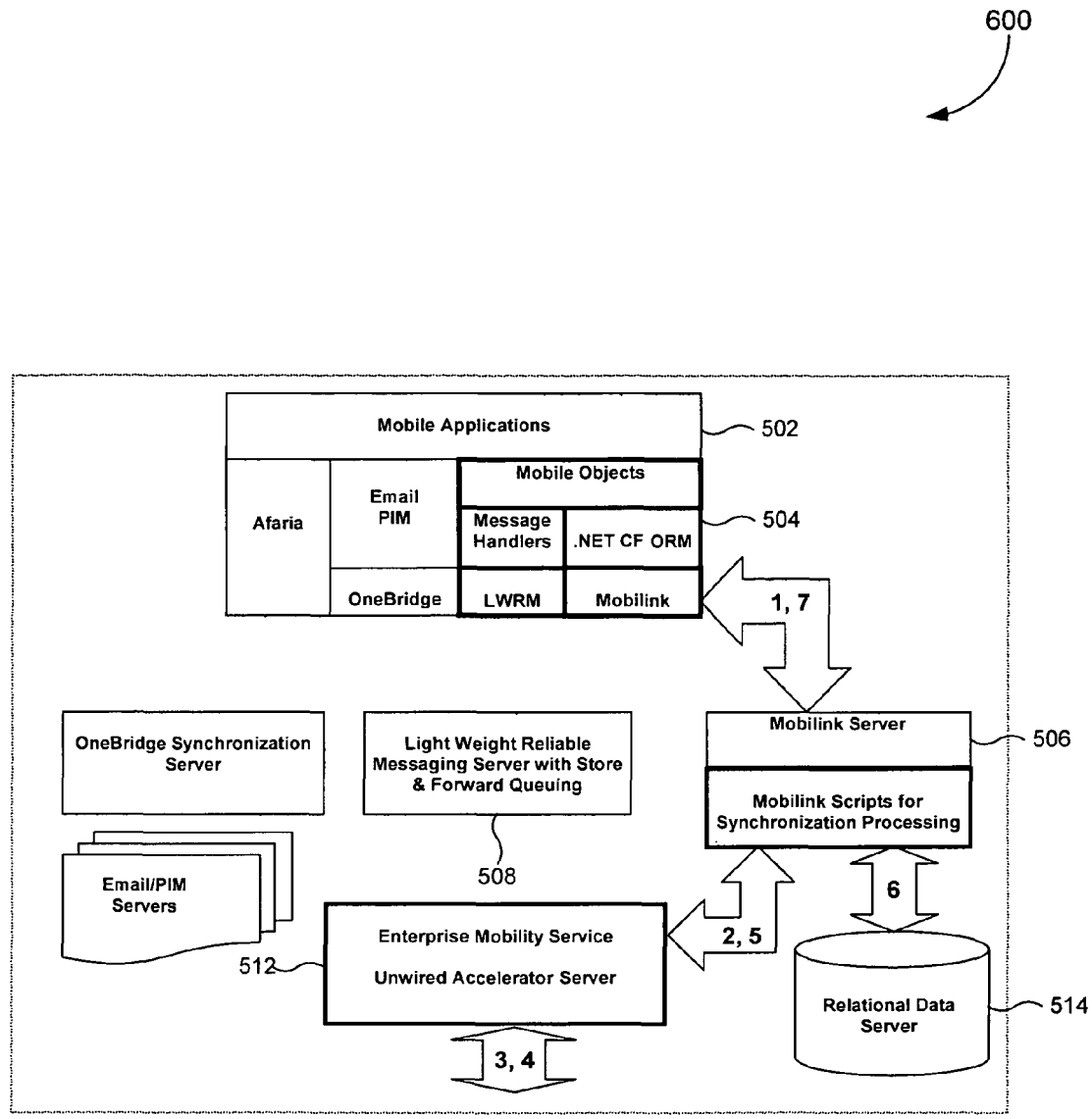
FIG. 6 illustrates an exemplary operational flow diagram for business methods employing synchronous one-way services.

To better illustrate run time architecture 500, an exemplary flow sequence of operation based on BSOP is provided below. FIG. 6 illustrates an exemplary operational flow diagram 600 for business methods employing synchronous one-way services. The labeled block arrows in FIG. 6 correspond to the numbered steps below, which describe a sequential flow of operations:

1. At the mobile device, a mobile user executes a mobile application 502 causing it to retrieve mobile objects for display and to perform business operations. As business operations execute, mobile and temporary objects may be modified at the mobile device. Simultaneously, business operations at the mobile device trigger service invocations at the enterprise. In an embodiment, service invocations are stored in a database and are delivered to the enterprise when synchronization is initiated by the mobile application.
2. At the enterprise, an upload event script at mobility synchronization server 506 triggers UNWIRED ACCELERATOR (UA) 512 to execute the invoked services.
3. UA 512 can execute the services directly using its own Service Invocation Module (SIM) or by dispatching them to the service-oriented architecture (SOA) implementation used within the enterprise through the Enterprise Service Bus (ESB). The UA SIM does not need to support asynchronous service execution. However, SIM needs to be able to associate and send the response of an asynchronous service execution to the appropriate mobile device via reliable messaging.
4. When the invoked services are executed, the set of mobile objects represented by tables on relational data server 514 are updated.
5. Mobility synchronization server 506 directly retrieves information required for the download phase of synchronization. Alternatively, an appropriate event script at synchronization server 506 prompts UA 512 to generate this information as a relational dataset. In an embodiment, UA 512 has the ability, while generating the information, to calculate changes based on configuration parameters and on the previous and current versions of the dataset.
6. The event script at mobility synchronization server 506 accesses relational data server 514 to retrieve the generated information for download to the mobile device.
7. Download to the mobile device is performed and mobile objects are synchronized between the mobile device and the enterprise.

5 Tooling 5.1 Mobile Development Tooling and Architecture

Figure 7:
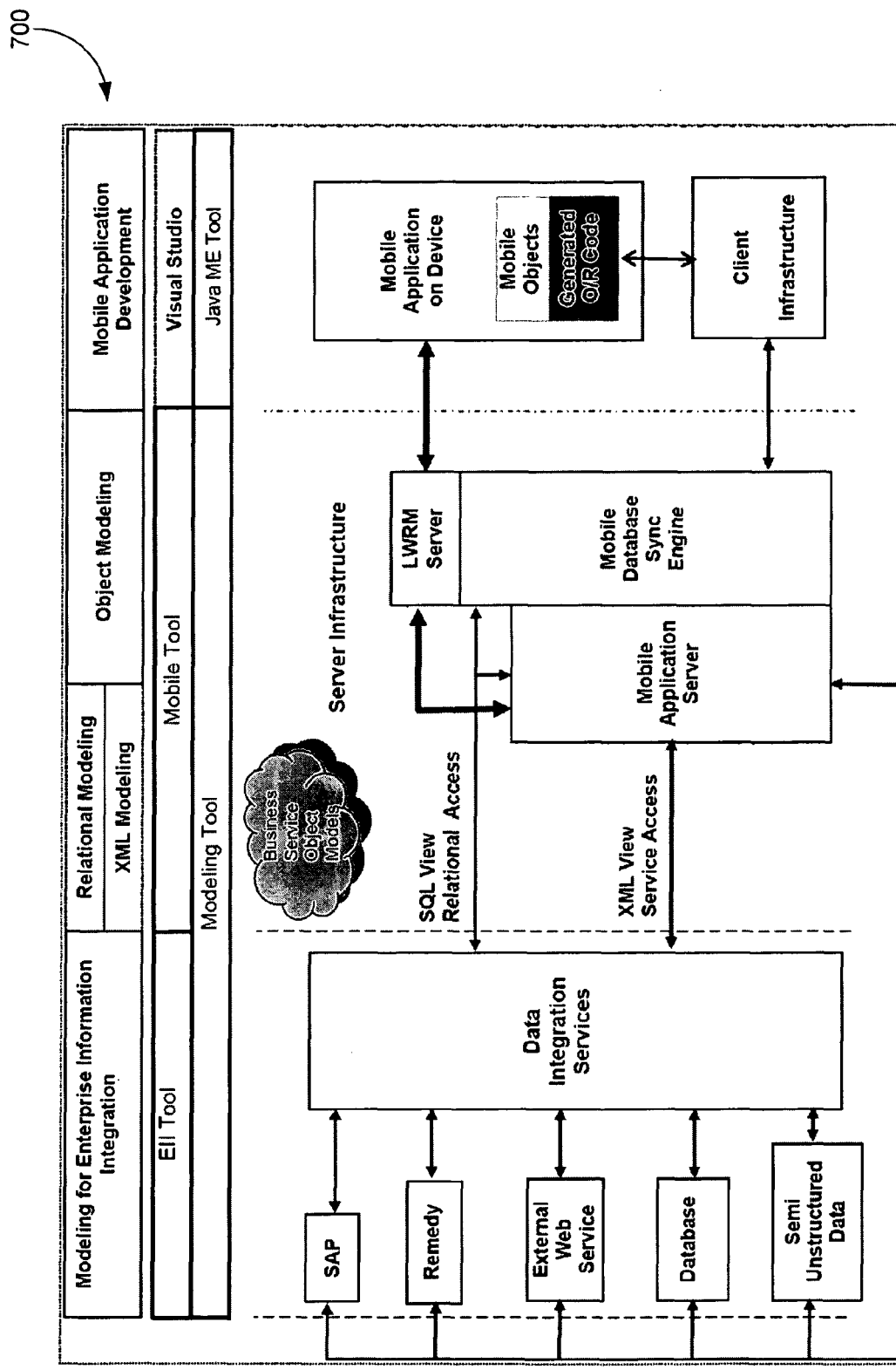
FIG. 7 illustrates various exemplary design environments that can be used to develop a mobile infrastructure architecture.

Tooling, according to the present invention, enables a seamless development environment for mobile applications. FIG. 7 illustrates different design environments that can be used to develop different portions of a mobile infrastructure architecture. The design process of FIG. 7 is based on a bottom up approach starting with object modeling and development.

From a development perspective, the various underlying data sources are presented as objects (business processes, coarse grained services, database, Enterprise Information Integration (EII) views, etc.), thereby reducing the complexity of building a mobile application to that of a relatively straightforward GUI application development on the device. Accordingly, mobile developers focus on identifying appropriate data sources, optionally providing value-added logic for additional validation and processing of the data, and creating a proper visualization of the data on the device itself.

The object view of the mobilized data source is reusable across multiple mobile applications. Application construction/maintenance overhead is greatly reduced. This also allows mobile application developers to create multiple variations of device applications to suit the needs of different mobile end-user types.

5.2 Design Flow

With object-oriented programming, it is assumed that modeling of real world phenomena is made easier as there is normally a mapping from the real world to objects. However, developers must still understand the problem domain and the real world objects/processes that are involved before they can design appropriate objects for the application. Hence, after studying the problem domain and or requirements, the first step is to design the objects that are to be used within the applications.

After developing the objects, the next step is to enhance their functionality with business methods. To do so, the developer will browse for appropriate services that are deployed to service containers within the enterprise through some sort of repository (UDDI). Alternatively, the developer can leverage a service explorer offered by the integration tooling. By means of drag and drop, mobile tooling generates the code necessary for interaction with the enterprise based on the mobile infrastructure.

Once the object has business methods added, the tooling can be used to generate all the necessary code and artifact based on properties set for the object and its business methods. In particular, metadata and artifacts for the UNWIRED ACCELERATOR and the mobile synchronization server need to be generated.

With the mobile objects and business methods developed, the development of the mobile application can be completed. All mobile objects and generated code will be in C# and packaged as a Visual Studio project. Developers will use Visual Studio to complete the mobile application development.

6 Example Computer Implementation

Figure 8:
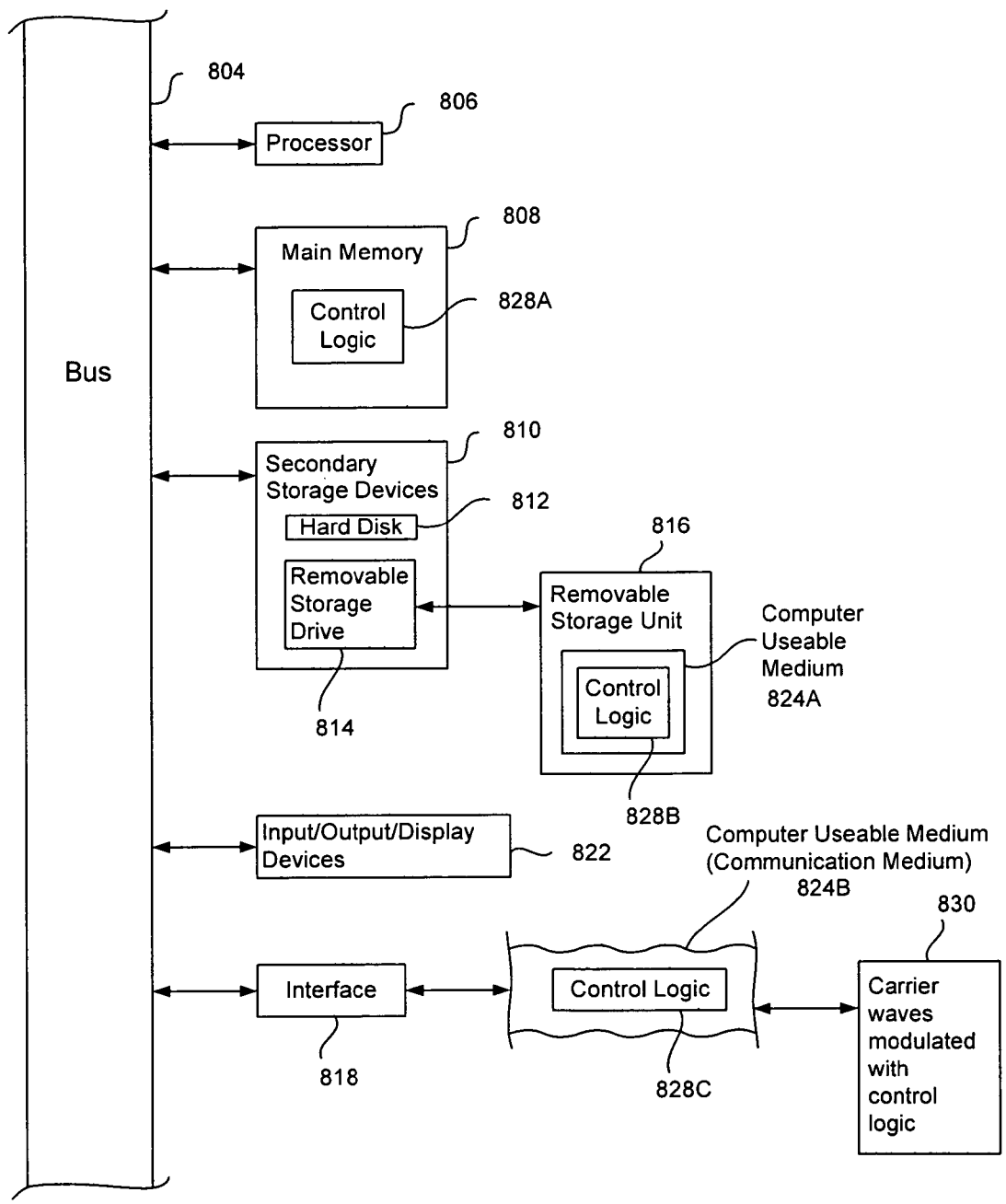
FIG. 8 illustrates an exemplary computer useful for implementing components and modules of the invention.

The functionality of the invention as described herein may be achieved using well known computers, such as computer 802 shown in FIG. 8.

The computer 802 can be any commercially available and well known computer capable of performing the functions described herein, such as computers available from International Business Machines, Apple, Sun, HP, Dell, Compaq, Digital, Cray, etc.

The computer 802 includes one or more processors (also called central processing units, or CPUs), such as a processor 806. The processor 806 is connected to a communication bus 804.

The computer 802 also includes a main or primary memory 808, such as random access memory (RAM). The primary memory 808 has stored therein control logic 828A (computer software), and data.

The computer 802 also includes one or more secondary storage devices 810. The secondary storage devices 810 include, for example, a hard disk drive 812 and/or a removable storage device or drive 814, as well as other types of storage devices, such as memory cards and memory sticks. The removable storage drive 814 represents a floppy disk drive, a magnetic tape drive, a compact disk drive, an optical storage device, tape backup, etc.

The removable storage drive 814 interacts with a removable storage unit 816. The removable storage unit 816 includes a computer useable or readable storage medium 824 having stored therein computer software 828B (control logic) and/or data. Removable storage unit 816 represents a floppy disk, magnetic tape, compact disk, DVD, optical storage disk, or any other computer data storage device. The removable storage drive 814 reads from and/or writes to the removable storage unit 816 in a well known manner.

The computer 802 also includes input/output/display devices 822, such as monitors, keyboards, pointing devices, etc.

The computer 802 further includes a communication or network interface 818. The network interface 818 enables the computer 802 to communicate with remote devices. For example, the network interface 818 allows the computer 802 to communicate over communication networks or mediums 824B (representing a form of a computer useable or readable medium), such as LANs, WANs, the Internet, etc. The network interface 818 may interface with remote sites or networks via wired or wireless connections.

Control logic 828C may be transmitted to and from the computer 802 via the communication medium 824B. More particularly, the computer 802 may receive and transmit carrier waves (electromagnetic signals) modulated with control logic 830 via the communication medium 824B.

Any apparatus or manufacture comprising a computer useable or readable medium having control logic (software) stored therein is referred to herein as a computer program product or program storage device. This includes, but is not limited to, the computer 802, the main memory 808, the secondary storage devices 810, the removable storage unit 816 and the carrier waves modulated with control logic 830. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

7 Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for synchronizing a data state of a mobile application residing at a mobile device and a corresponding enterprise data state of the mobile application residing at a server, comprising:
    invoking, at the mobile device, one or more business service methods after a previous synchronization session between the mobile device and the server, wherein invoking the one or more business service methods comprises:
        modifying one or more business service objects at the mobile device using the one or more business service methods; and
        changing the data state of the mobile application at the mobile device according to the one or more modified business service objects; and
    conveying the one or more business service methods from the mobile device to the server, wherein said conveying comprises issuing at the mobile device one or more service invocations corresponding respectively to the one or more business service methods, and sending the one or more service invocations to the server, wherein the one or more service invocations trigger an execution process at the server.

2. The method of claim 1, wherein said one or more business service methods invoke local methods that act on said one or more business service objects at the mobile device, thereby causing a state differential between the enterprise data state and the data state of the mobile application at the mobile device.

3. The method of claim 2, wherein said one or more enterprise business methods act on corresponding business objects at the server, thereby causing a state change at the server that is equivalent to said state differential.

4. The method of claim 1, further comprising:
    using mobile agents to invoke said enterprise business methods at the server.

5. The method of claim 1, wherein said conveying comprises:
    individually conveying said one or more business service methods to the server contemporaneous with execution of the mobile application at the mobile device.

6. The method of claim 1, wherein said conveying comprises:
    conveying said one or more business service methods in a batch to the server.

7. The method of claim 5, further comprising:
    using a reliable messaging service to convey said business service methods.

8. The method of claim 6, further comprising:
    using a synchronization session to convey said business service methods.

9. The method of claim 1, wherein said conveying comprises:
    using a one-way synchronous service to convey said one or more business service methods to the server, wherein said one-way synchronous service requires no response.

10. The method of claim 9, wherein service time at the server of said one or more business service methods is bounded and relatively low.

11. The method of claim 1, wherein said conveying comprises:
    using a one-way asynchronous service to convey said one or more business service methods to the server, wherein said one-way asynchronous service requires no response from the server.

12. The method of claim 11, wherein service time at the server of said one or more business service methods is unbounded.

13. The method of claim 1, wherein said conveying comprises:
    using a two-way asynchronous service to convey said one or more business service methods to the server.

14. The method of claim 13, wherein service time at the server of said one or more business service methods is unbounded.

15. The method of claim 13, further comprising:
    receiving responses to the conveying of said one or more business service methods, wherein said responses are delivered in different thread contexts than those conveying said business service methods.

16. The method of claim 1, wherein said conveying comprises:

using a two-way synchronous service to convey said one or more business service methods to the server.

17. The method of claim 16, wherein service time at the server of said one or more business service methods is bounded and relatively low.

18. The method of claim 1, wherein said conveying comprises:
using an online synchronous service to convey said one or more business service methods to the server.

19. The method of claim 18, wherein service time at the server of said one or more business service methods is limited.

20. The method of claim 18, further comprising:
receiving responses to the conveying of said one or more business service methods, wherein said responses are delivered in same thread contexts as those conveying said business service methods.

21. The method of claim 1, further comprising:
receiving, by the mobile device, modified business objects from the server; and
applying said modified business objects to synchronize the data state of the mobile application at the mobile device and the enterprise data state of the mobile application at the server.

22. The method of claim 1, wherein said conveying comprises:
using any combination of one-way synchronous service, two-way synchronous service, one-way asynchronous service, two-way asynchronous service, and online synchronous service to convey said one or more business service methods to the server.

23. A non-transitory computer useable medium having computer program logic recorded thereon that, when executed by a processor, causes the processor to synchronize a data state of a mobile application residing at a mobile device and a corresponding enterprise data state of the mobile application residing at a server, by performing the steps of:
invoking, at the mobile device, one or more business service methods after a previous synchronization session between the mobile device and the server, wherein invoking the one or more business service methods comprises:
modifying one or more business service objects at the mobile device using the one or more business service methods; and
changing the data state of the mobile application at the mobile device according to the one or more modified business service objects; and
conveying the one or more business service methods from the mobile device to the server, wherein said conveying comprises issuing at the mobile device one or more service invocations corresponding respectively to the one or more business service methods, and sending the one or more service invocations to the server, wherein the one or more service invocations trigger an execution process at the server.

24. The computer useable medium of claim 23, wherein said one or more business service methods invoke local methods that act on said one or more business service objects at the mobile device, thereby causing a state differential between enterprise data state and the data state of the mobile application at the mobile device.

25. The computer useable medium of claim 24, wherein said one or more enterprise business methods act on corresponding business objects at the server, thereby causing a state change at the server that is equivalent to said state differential.

26. The computer useable medium of claim 23, wherein said conveying comprises:
individually conveying said one or more business service methods to the server contemporaneous with execution of the mobile application at the mobile device.

27. The computer useable medium of claim 23, wherein said conveying comprises:
conveying said one or more business service methods in a batch to the server.

28. The computer useable medium of claim 23, wherein said conveying comprises:
using a reliable messaging service to convey said business service methods.

29. The computer useable medium of claim 23, wherein said conveying comprises:
using a synchronization session to convey said business service methods.

30. The computer useable medium of claim 23, wherein said conveying comprises:
using any combination of one-way synchronous service, two-way synchronous service, one-way asynchronous service, two-way asynchronous service, and online synchronous service to convey said one or more business service methods to the server.

* * * * *